United States Patent
Dantlgraber

(10) Patent No.: US 7,010,912 B2
(45) Date of Patent: Mar. 14, 2006

(54) DRIVE MECHANISM, PARTICULARLY FOR A MOVEABLE PART OF A CLOSING UNIT OR THE INJECTION UNIT OF A PLASTIC INJECTION MOULDING MACHINE

(75) Inventor: Jörg Dantlgraber, Lohr am Main (DE)

(73) Assignee: Bosch Rexroth AG, Lohr/Main (DE)

( * ) Notice: Subject to any disclaimer, the term of this patent is extended or adjusted under 35 U.S.C. 154(b) by 40 days.

(21) Appl. No.: 10/477,418

(22) PCT Filed: May 7, 2002

(86) PCT No.: PCT/EP02/04994

§ 371 (c)(1),
(2), (4) Date: Jun. 7, 2004

(87) PCT Pub. No.: WO02/096617

PCT Pub. Date: Dec. 5, 2002

(65) Prior Publication Data

US 2004/0216600 A1    Nov. 4, 2004

(30) Foreign Application Priority Data

May 19, 2001    (DE)    ................................ 101 24 515

(51) Int. Cl.
*F15B 7/00*    (2006.01)
(52) U.S. Cl. ........................ 60/560; 60/563; 425/489
(58) Field of Classification Search ............ 60/545, 60/560, 563; 425/589, 590
See application file for complete search history.

(56) References Cited

U.S. PATENT DOCUMENTS

| 4,030,299 A | | 6/1977 | Reuschel et al. | |
| 5,338,174 A | * | 8/1994 | Miese et al. | ................. 425/589 |

FOREIGN PATENT DOCUMENTS

| DE | 4111594 | 10/1992 |
| WO | 9211993 | 7/1992 |
| WO | 0189801 | 11/2001 |
| WO | 0211970 | 2/2002 |

* cited by examiner

*Primary Examiner*—Thomas E. Lazo
(74) *Attorney, Agent, or Firm*—Martin A. Farber

(57) ABSTRACT

A drive device has a drive element movable axially by means of an electric motor and a hydraulic unit. In the drive device it is important to execute a rapid adjusting movement and then to exert high forces. This causes high reaction forces on the lifting spindle. High reaction forces are avoided if a force intensifier with two pistons movable in relation to one another and differing from one another in the size of their active surfaces along with an intermediate part which, together with the pistons, encloses a pressure space filled with a pressure fluid is used, if the smaller active surface is connected mechanically to the drive element, for the adjusting movement, the hydraulic unit can be moved as a whole, and if, for exerting a high force by means of the larger active surface, the intermediate part can be blocked against displacement in relation to a fixed stand.

14 Claims, 3 Drawing Sheets

DRIVE MECHANISM, PARTICULARLY FOR A MOVEABLE PART OF A CLOSING UNIT OR THE INJECTION UNIT OF A PLASTIC INJECTION MOULDING MACHINE

FIELD AND BACKGROUND OF THE INVENTION

The invention relates to a drive device which is provided, in particular, for driving a movable part of the closing unit or of the injection unit of a plastic injection molding machine.

Within the closing unit of a plastic injection molding machine, the drive device moves the movable mold clamping plate of the machine. Such a drive device must fulfill two important different requirements. On the one hand, it is to move the mold clamping plate as quickly as possible in order to close and to open the mold, so that the cycle time for producing a molding can be kept short. On the other hand, it is to be capable of keeping the mold clamping plate and consequently the entire mold shut with great force against the high injection pressure. On the one hand, therefore, adjusting movements are to be executed at high speed and, on the other hand, high forces are to be exerted without any appreciable movement. Requirements of this kind may arise not only with regard to the closing unit, but also in respect of the injection unit of a plastic injection molding machine. For example, when plastic is being injected into the mold, the plasticizing worm is moved at relatively high speed in the direction of the mold, until the mold is filled completely with plastic. When the plastic melt contained in the mold is subsequently exposed to what may be referred to as dwell pressure, the drive has to apply a high force without any appreciable movement of the plasticizing worm.

U.S. Pat. No. 4,030,299 discloses a purely hydraulic drive for the movable mold clamping plate of a plastic injection molding machine, said drive also containing a hydraulic force intensifier. The latter has a movable piston with a small active surface, a further movable piston with a large active surface and a cylinder which, together with the pistons, encloses a pressure space filled with a pressure fluid. The cylinder is arranged at a fixed location on the stand of the injection molding machine. The drive includes, moreover, hydraulic cylinders which move the movable mold clamping plate in order to close and open the mold. When the mold is in the open state, the volume of the pressure space of the hydraulic force intensifier is minimal. If, then, the movable mold clamping plate is moved by the hydraulic cylinders with the effect of a closing of the mold, the large piston of the hydraulic force intensifier is taken up, the volume of the pressure space of the hydraulic force intensifier increasing and pressure medium flowing out of a reservoir into the pressure space via a suction follow-up valve. Thereafter, the small piston of the hydraulic force intensifier is moved into the pressure space, thereby generating a high pressure which brings about a high closing force via the large active surface of the large piston. The small piston is moved hydraulically due to the supply of pressure fluid. Thus, in the drive device according to U.S. Pat. No. 4,030,299, various hydraulic drive components are present for the adjusting movement of the movable mold clamping plate and for exerting a high force. During the adjusting movements of the mold clamping plate, a large amount of pressure fluid flows back and forth between the pressure space and the reservoir, thus necessitating correspondingly large valves and fluid ducts.

A drive device is known from DE 41 11 594 A1. In this drive device, a hydraulic cylinder having a large active surface is firmly connected to the movable mold clamping plate. The unit consisting of the movable mold clamping plate and of the hydraulic cylinder can be moved by an electric motor, via a mechanism comprising a lifting spindle and a spindle nut, in order to close the mold quickly and open it quickly. The high closing force is applied by the action of pressure upon the hydraulic cylinder movable together with the mold clamping plate. In this case, the entire reaction force is diverted to the machine stand via the spindle and the spindle nut. The spindle must therefore have a highly robust design, is overdimensioned for the adjusting movement and is correspondingly costly.

SUMMARY OF THE INVENTION

The object on which the invention is based is to develop further a drive device such that, at low outlay, on the one hand, a rapid adjusting movement is possible and, on the other hand, a high force effect can also be achieved.

The said aim is achieved In such a drive device, therefore, a hydraulic force intensifier is used, in the pressure space of which a defined volume of a pressure fluid is enclosed, at least during the adjusting movement and during the subsequent exertion of a high force, apart from changes in volume due to a pressure change. Other hydraulic components are not necessary, in principle, for the drive device according to the invention. According to the invention, the small first hydraulic piston of the hydraulic force intensifier is connected mechanically to the drive element axially movable by means of the drive motor designed particularly as an electric motor. Furthermore, according to the invention, for the adjusting movement of an element to be driven, the hydraulic unit is movable as a whole, with the result that the speed of the large second hydraulic piston coupled mechanically to the element to be driven is equal to the high speed of the drive element moved axially by the electric motor. So that a high force can be exerted, the intermediate part of the hydraulic force intensifier is blocked against displacement in relation to a fixed stand, so that, as a result of a further movement of the first hydraulic piston over a relatively short distance, a high pressure can be built up in the pressure space of the force intensifier, which generates a high force at the large active surface of the second hydraulic piston. In this case, only a fraction of the force, which corresponds to the active surface of the first hydraulic piston, has to be supported via the drive element. Particularly with regard to what may be referred to as dual-plate machines, the drive motor and the drive element are preferably arranged with respect to the movable part in such a way that, when the high force is being built up and exerted, the drive element is subjected to tensile stress. Although one drive element is mentioned here, this, of course, also embraces the situation where the drive device has a plurality of drive elements interacting in parallel.

So that the hydraulic unit can be moved as a whole, three of its components are coupled to one another in such a way that the intermediate part and the second hydraulic piston follow the drive element.

Particularly with regard to large plastic injection molding machines with a high force for keeping the mold shut, a relatively high tear-open force, which lies in the range of between 5% and 10% of the keeping-shut force, is also necessary for opening the mold. Since, conversely to what occurs during keeping shut, in a dual-plate machine, the drive element is therefore subjected to compressive load during the tearing-open operation, it may be the case that the dimensioning of the drive element must be governed rather by the necessary tearing-open force than by the necessary keeping-shut force, in order to prevent a bending of the drive element. What is achieved here is that, even when a cost-effective drive element designed for tensile load during keeping shut is used, there is no risk of bending during the tearing-open operation. Hence, both for keeping shut and for tearing open the mold of a plastic injection molding machine, a hydraulic force intensifier is provided for each drive element, so that the drive element or drive elements is or are subjected to only low load. In this case, the piston portion, having the small diameter, of a third hydraulic piston designed as a stepped piston forms the small piston of the hydraulic force intensifier active during the tearing-open operation. During the adjusting movement, the third hydraulic piston is pressed with the large piston portion, with high force in the direction of the adjusting movement, against a stop which is fixed in relation to the housing on which or in which the first hydraulic piston and the third hydraulic piston are located. The force is higher than the force which is generated at the first hydraulic piston by a pressurizing pressure acting upon the first pressure space and the active surface of the first hydraulic piston, the pressurizing pressure being selected such that it is above the pressure necessary for accelerating and moving the second hydraulic cylinder and the intermediate part in the first pressure space. The third hydraulic piston then acts in the same way as a fixed stop for the first hydraulic piston. The high pressurizing pressure in the first pressure space causes the fluid cushion in the first pressure space to seem like a rigid connection between the first hydraulic piston and the housing. On the other hand, the third pressure space adjacent to the large piston portion of the third hydraulic piston can be relieved of pressure, so that the third hydraulic piston can be displaced in order to tear open the mold.

A third hydraulic piston may, in principle, be arranged laterally in relation to the drive element and/or to the first hydraulic piston. Preferably, however, according a feature of the invention, it is in alignment with and upstream of the first hydraulic piston.

If, according to another feature of the invention the first active surface of the third hydraulic piston is larger than the active surface of the first hydraulic piston, the force excess on the third hydraulic piston is obtained even when the third pressure space and the first pressure space are acted upon by the same pressure. This pressure may be set by means of a single hydraulic apparatus. Preferably, according to still another feature of the invention, the first pressure space and the third pressure space can be connected to the same pressure source, for example to a hydraulic pump, so as to be acted upon by the same pressure. According to yet another feature of the invention, a switchable valve is expediently used for the change between pressure action upon and pressure relief of the third pressure space.

According to another feature of the invention, the fourth hydraulic piston is adjacent to a pressure space with a boundary wall fixed in relation to the machine stand. The fourth hydraulic piston can therefore be firmly connected to or at least be supportable by the second hydraulic piston or to the machine stand or the mold clamping plate fixed in relation to the stand, the corresponding pressure space then being located between the fourth hydraulic piston and the mold clamping plate or the second hydraulic cylinder. The latter version is preferred, since the fluidic connection from the pressure space at the small piston portion of the third hydraulic piston to the pressure space at the fourth hydraulic piston can then be short, particularly when the pressure space at the second piston portion is likewise located in the second hydraulic piston.

According to still another feature of the invention, the fourth hydraulic piston may also be active between the second hydraulic piston and the intermediate part, in which case said fourth hydraulic piston can be fixed with respect to the intermediate part or to the second hydraulic piston, that is to say is also movable, or is fixed, that is to say permanently immovable, and, in each case with the other part of the two parts, intermediate part and hydraulic piston, delimits a pressure space which is connected to a pressure space at the second piston portion of the third hydraulic piston.

In particular, according to another feature of the invention the fourth hydraulic piston is located in or on the intermediate part or in or on the second hydraulic piston and is connected to a fifth hydraulic piston in each case in the other part via a piston rod. The fifth hydraulic piston serves, for example, in order, after the closing of the mold, when the second hydraulic piston or the movable mold clamping plate connected to the latter bears against the fixed mold clamping plate, to displace the intermediate part also somewhat toward the second hydraulic piston into a locking position, in so far as said intermediate part can be blocked only at discrete points.

In a design according to yet another feature of the invention, a once-only setting of the intermediate part and of the second hydraulic piston in relation to one another when a new molding die is used is possible with the aid of the fifth hydraulic piston. After setting, the fifth hydraulic piston can remain blocked with respect to the part on which it is located, because, for the fourth hydraulic piston, the sixth hydraulic piston implements on the other part a stop which, during the build-up of the high keeping-shut force and the associated slight movement of the second hydraulic piston, can yield, but, for tearing open the mold, acts as a fixed stop by being acted upon by pressure. According to another feature of the invention, the sixth hydraulic piston is preferably arranged in alignment with the fourth hydraulic piston.

To make the fluidic connections between the individual pressure spaces adjacent to the hydraulic pistons, it is beneficial if, according to yet another feature of the invention, the fourth hydraulic piston or the fourth and the fifth hydraulic piston are located on the same housing as the first and the third hydraulic piston.

It may be pointed out here, in quite general terms, that the reception spaces for the hydraulic pistons may be formed in each case directly in the intermediate part or in the second hydraulic piston or in plates connected thereto or else separate cylinders having the reception spaces may be provided, said cylinders being fastened to the intermediate part or to the second hydraulic piston.

BRIEF DESCRIPTION OF THE DRAWINGS

Three exemplary embodiments of a drive device according to the invention, which are intended in each case for what may be referred to as a dual-plate plastic injection molding machine, are illustrated in the drawings. The invention, then, is explained in more detail with reference to these drawings in which.

DETAILED DESCRIPTION OF THE PREFERRED EMBODIMENT

Figure 1:
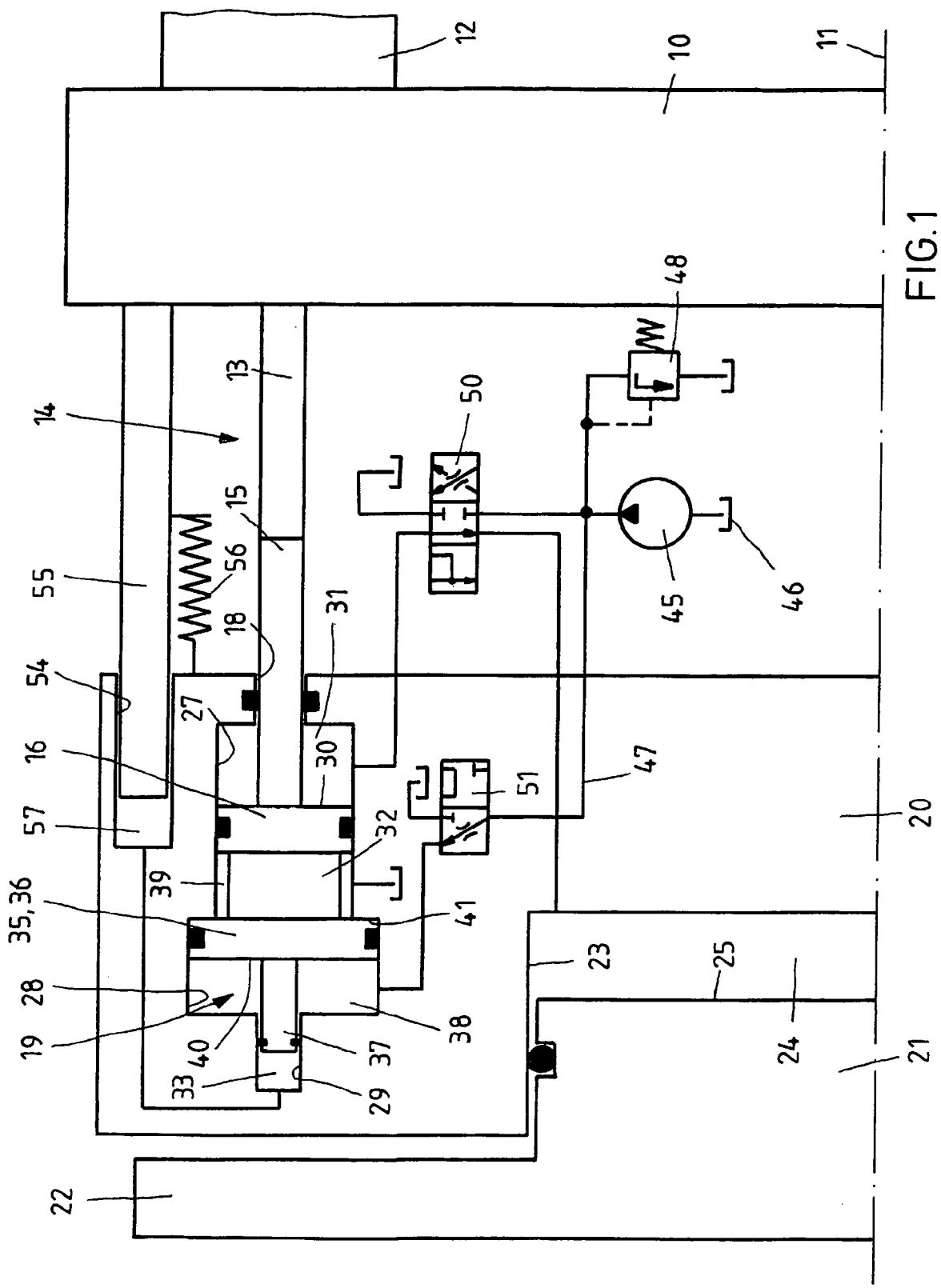
FIG. 1 shows the first exemplary embodiment, in which a fourth hydraulic piston is guided in a cylindrical receptacle of the second hydraulic piston and, with the mold closed, can be supported on the fixed mold clamping plate for the purpose of tearing open said mold.

In the exemplary embodiments shown, two spindle nuts are rotatably mounted axially at a fixed location in a stationary mold clamping plate 10, diametrically opposite one another with respect to a center axis 11, via self-aligning roller bearings in a way not illustrated in any more detail, each of said spindle nuts being capable of being driven in rotation by an electric motor 12 fastened to the mold clamping plate 10. Each spindle nut is in engagement via balls with a threaded portion 13 of a rectilinearly movable lifting spindle 14 secured against rotation. A piston rod 15 of a first hydraulic piston 16, which is a small piston of a hydraulic force intensifier 17, extends from the threaded portion 13 of a lifting spindle 14, parallel to the center axis 11, sealed off, through a passage 18 into a cavity 19, having three cylindrical portions differing from one another in their diameters, of a second hydraulic piston 20 which is the large piston of the hydraulic force intensifier 17. Designated here as the second hydraulic piston is a machine part which is of essentially plate-shaped design and has a projecting piston portion 21 (FIGS. 2 and 3), which penetrates into a corresponding piston receptacle 23 of an intermediate part 22 of the hydraulic force intensifier 17, or, set back, a piston receptacle 23 (FIG. 1), into which a projecting piston portion 21 of the intermediate part 22 penetrates. The piston portion 21 has an active surface 25 which is adjacent to a pressure space 24 and which is substantially larger, for example thirty times larger, than the active surface 31 of a hydraulic piston 16. The movable mold clamping plate of the machine is fastened to the hydraulic piston 20 and is guided along spars in the direction of the center axis 11 in a way not illustrated in any more detail.

The passage 18 is followed, in the hydraulic piston 20, first by a cavity portion 27, the diameter of which is about three times as large as the diameter of the piston rod 15. The following cavity portion 28 has a larger diameter and is shorter than the cavity portion 27. Finally, the diameter of the last blind-hole-like cavity portion 29 is about as large as the diameter of the passage 18 and consequently of the piston rod 15. The hydraulic piston 16 is located in the cavity portion 27 and on the piston-rod side is adjacent with an annular active surface 30 to an annular pressure space 31. On the side facing away from the piston rod, the hydraulic piston 16 carries a short tappet 32.

A third hydraulic piston 35 is designed as a stepped piston and is located with its piston portion 36 of large diameter in the cavity portion 28 and penetrates with a piston portion 37 of small diameter into the cavity portion 29 in a plunger-like manner. The free space upstream of the piston portion 37 is a pressure space which is filled with pressure medium and may be designated by 33. Located on that side of the piston portion 36 which faces away from the hydraulic piston 16 is an annular pressure space 38 which can be acted upon by system pressure or can be relieved of pressure. The space 39 between the two hydraulic pistons 16 and 35 is permanently relieved of pressure. By the action of pressure upon the annular active surface 40, which is larger than the annular active surface 30 on the hydraulic piston 16, from the pressure space 38, the hydraulic piston 35 can be pressed with the piston portion 36 against the step between the two cavity portions 27 and 28, said step constituting an axial stop 41.

The pressure spaces 31 and 38 can be supplied with a fluid pressure medium which is sucked in from a tank 46 by a hydraulic pump 45 and is conveyed into a pump line 47, to which a pressure limiting valve 48 is connected in order to set a system pressure. A first valve 50 can be changed over from a middle working position into two lateral working positions. In the middle working position of the valve 50, the pressure space 31 at the hydraulic piston 18 is fluidically connected to the pressure space 24 at the piston portion 21 of the hydraulic piston 20. In a first lateral working position, the pressure space 31 is connected, throttled, to the pump line 47 and the pressure space 24 is relieved to the tank. In the other lateral working position, both pressure spaces 24 and 31 are relieved to the tank. A second switching valve 51 can assume two working positions, the pressure space 38 being connected, throttled, to the pump line 47 in one working position and being relieved to the tank in the other working position.

In all three exemplary embodiments shown, the intermediate part 22 of the hydraulic force intensifier 17 can be firmly connected to the hydraulic piston 20 via a releasable coupling device, so that, during the closing of the mold, that is to say during the adjusting movement, the hydraulic piston 20 and the intermediate part 22 can be moved as a unit. After the closing of the mold, the coupling between the hydraulic piston 20 and the intermediate part 22 is released and the intermediate part is retained in relation to the machine stand. In principle, the blocking device between the intermediate part and the machine stand or the mold clamping plate fixed in relation to the latter may be designed in such a way that, within a defined zone, blocking at infinite intervals is possible at any desired point. With regard to the exemplary embodiment according to FIG. 1, such a possibility may be assumed to be afforded.

In the exemplary embodiment according to FIG. 1, the hydraulic piston 20 possesses, distributed at uniform intervals about the center axis 11, a plurality of blind-hole-like cylindrical receptacles 54 which are open toward the fixed mold clamping plate 10. In each receptacle 54, a plunger piston 55 is guided, as the fourth hydraulic piston of the exemplary embodiment according to FIG. 1, is held in the receptacle 54 by a spring 56, projects from the receptacle and, with the mold closed, can be supported on the fixed mold clamping plate 10. The pressure space 57 in the receptacle 54 upstream of the plunger piston 55 is connected to the pressure space 33 upstream of the piston portion 37 of the hydraulic piston 35.

Figure 2:
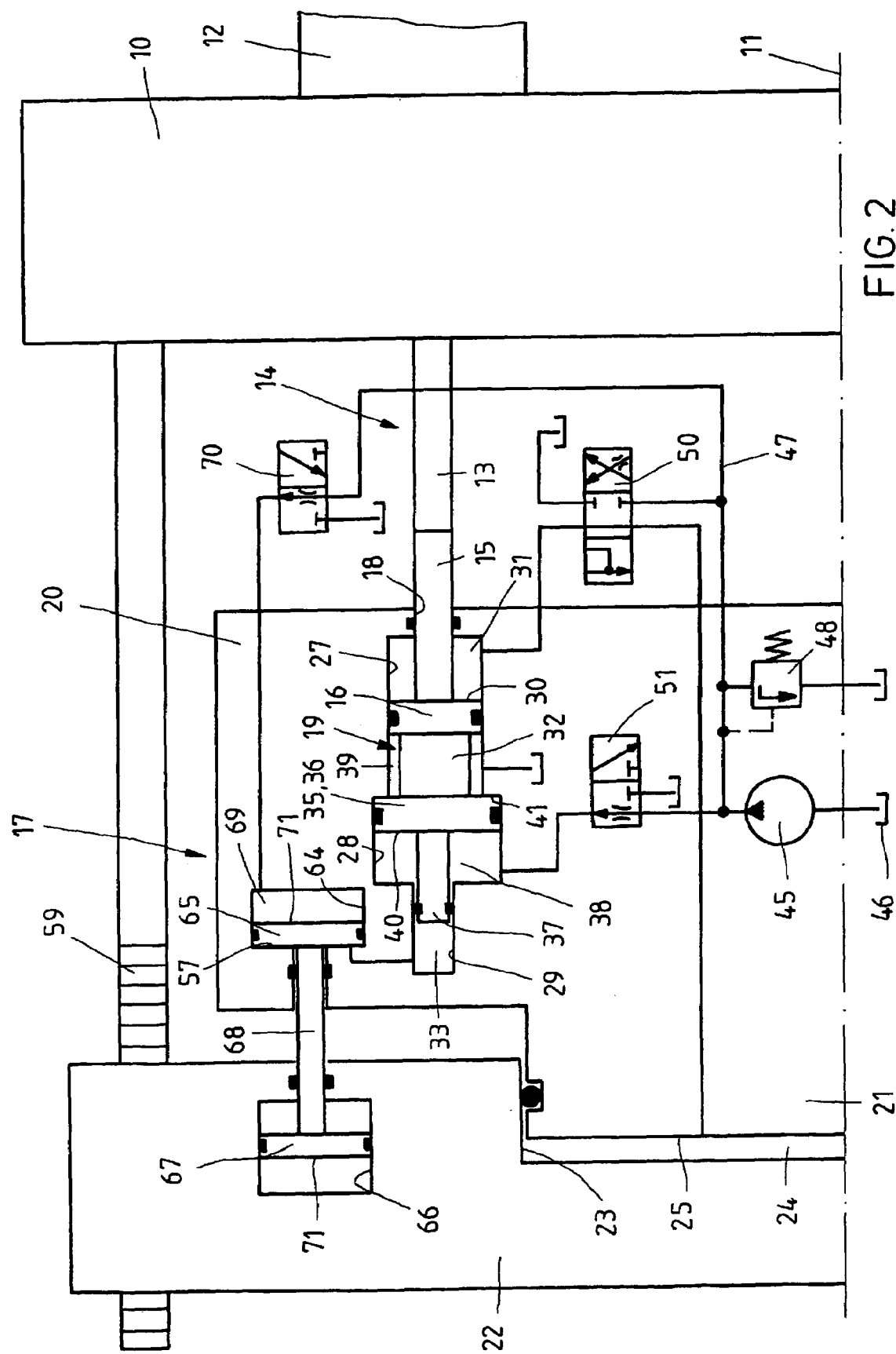
FIG. 2 shows the second exemplary embodiment, in which the fourth hydraulic piston is likewise guided in the second hydraulic piston, moreover is connected via a piston rod to a sixth hydraulic piston and serves with the latter for the releasable coupling of the second hydraulic piston and of the intermediate part.
Figure 3:
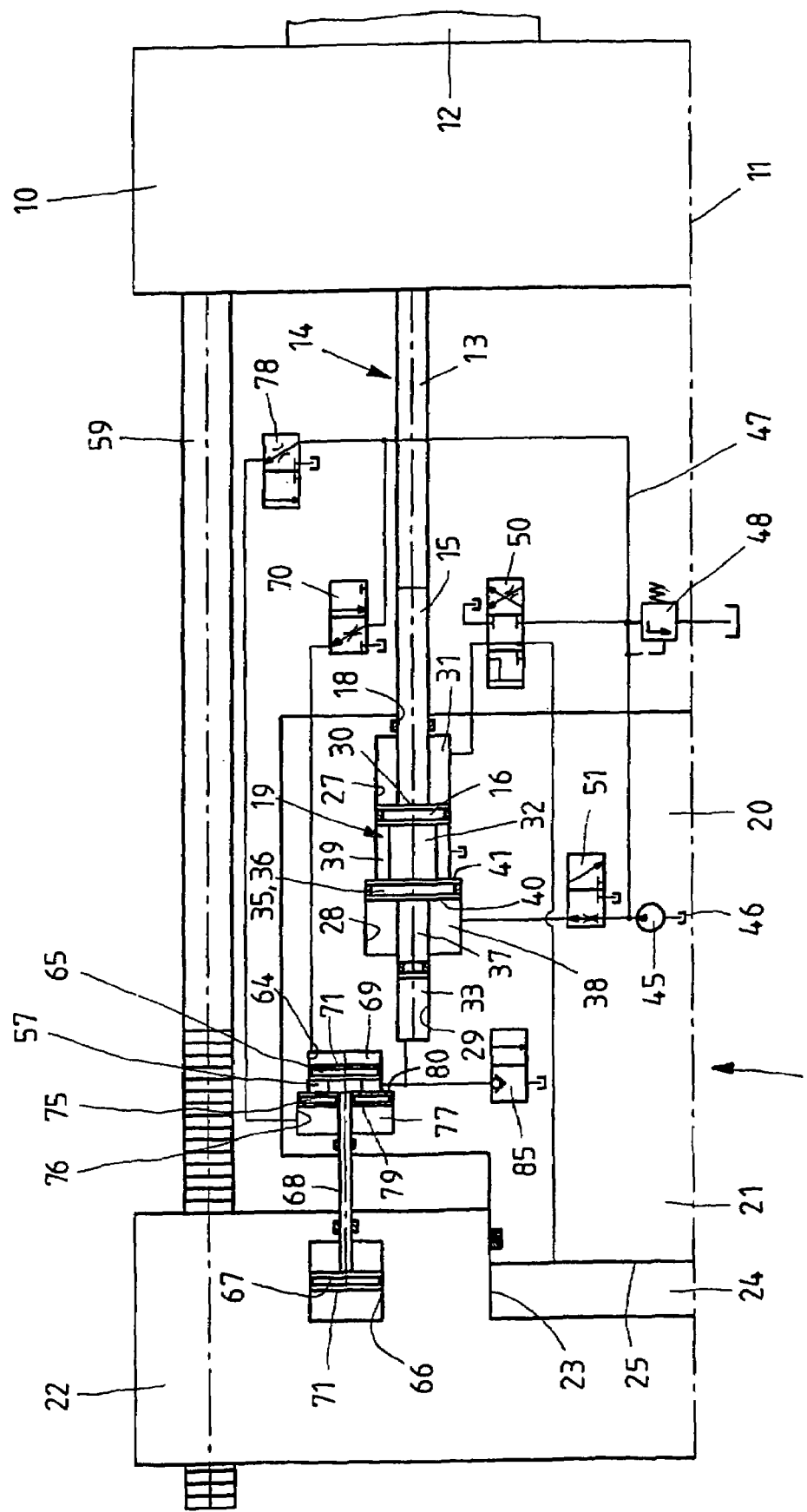
FIG. 3 shows the third exemplary embodiment which is constructed in a similar way to the second exemplary embodiment, but in which a sixth hydraulic piston guided in the second hydraulic piston forms a movable stop for the fourth hydraulic piston.

In the exemplary embodiments according to FIGS. 2 and 3, the intermediate part 22 can be interlocked, with the aid of toothed locking rods 59 fastened to the fixed mold clamping plate and extending in the direction of the center axis 11, together with the fixed mold clamping plate 10 and consequently with the machine stand at discrete points spaced slightly apart from one another. The hydraulic piston 20 receives a fourth hydraulic piston 65 in each of a plurality of cylindrical cavities 64 distributed uniformly about the center axis 11. The intermediate part 22 likewise receives a fifth hydraulic piston 67 in each case in each of a plurality of cylindrical cavities 66 which are in alignment with the cavities 64 in the hydraulic piston 20. The two hydraulic pistons 66 and 67 lying in alignment with one another are firmly connected to one another via a piston rod 68. The pressure space 69, on the side facing away from the piston rod, at the hydraulic piston 65 is either connected, throttled, to the pump line 47 or relieved to the tank via a switching valve 70 having two working positions. The circular-cylindrical active surfaces 71, on the side facing away from the piston rod, of the two hydraulic pistons 65 and 67 are of equal size. The pressure space 57, on the piston-rod side, at the hydraulic piston 65, said pressure space corresponding to the identically designated pressure space from FIG. 1, is connected permanently to the pressure space 33 at the piston portion 37 of the stepped piston 35.

In the version according to FIG. 2, the hydraulic piston 65 can bear directly against the hydraulic piston 20 on the piston-rod side. By contrast, in the exemplary embodiment according to FIG. 3, the stop on the side of the piston rod 68 for the hydraulic piston 65 is formed by a sixth hydraulic piston 75 and can be switched to active and inactive. The hydraulic piston 75 has a larger outside diameter than the hydraulic pistons 65 and 67 and is located in a cavity 76 of larger diameter which is adjacent to the cavity 64 on the same side as the piston rod 68. The piston rod 68 passes, sealed off, through a central orifice of the hydraulic piston 75. On that side of the hydraulic piston 75 which faces away from the hydraulic piston 65, the pressure space 77 is either connected, throttled, to the pump line 47 or relieved to the tank via a switching valve 78 having two working positions. When the pressure space 77 and consequently an annular active surface 79 at the hydraulic piston 75 are acted upon by system pressure, the hydraulic piston 75 bears against the step 80 between the two cavities 64 and 76 and acts in the same way as a fixed boundary of the cavity 64. System pressure prevailing in the pressure space 69 cannot lift off the hydraulic piston 75 from the step, since the active surface 79 at the hydraulic piston 75 is larger than the active surface 71 at the hydraulic piston 65. The hydraulic piston 65 bears against the hydraulic piston 75 via a collar having an increased diameter in relation to the diameter of the piston rod 68. The annular pressure space between the two hydraulic pistons 65 and 75 corresponds to the pressure space 57 of the exemplary embodiment according to FIG. 2 and is connected to the pressure space 33 at the piston portion 37 of the hydraulic piston 35. During the relief of the pressure space 77, the hydraulic piston 65 can lift off the hydraulic piston 75 from the step 80, the volume of the pressure space 57 between the two hydraulic pistons increasing. When the hydraulic piston 75 approaches the step, the volume decreases. So that the change in volume can be compensated, the two pressure spaces 33 and 57 are connected to the tank in a second of two working positions of a switching valve 85. In the first working position, the two pressure spaces are shut off, free of leakage.

In the exemplary embodiment according to FIG. 3, after a new die has been mounted, when the pressure spaces 69 and 77 are acted upon by system pressure with the aid of the hydraulic piston 67, at the hydraulic piston 20 the intermediate part 22 is brought into a position lying as near as possible to the hydraulic piston 20, such that, with the mold closed, said intermediate part assumes with respect to the locking rods 59 a position such that it can be locked. For this purpose, the pressure spaces on both sides of the hydraulic piston 67 can be connected to the pressure source and to a tank via a throttling control valve not illustrated in any more detail. The pressure which is established in one or the other pressure space of the hydraulic piston 67 during the setting operation is substantially lower than the system pressure. After this setting, the two pressure spaces are shut off, free of leakage. As long as the same die is used, in principle, no further setting is necessary.

Assuming an open mold, then, the mold is to be closed. The valve 50 assumes the working position in which the pressure space 24 is relieved to the tank and the pressure space 31 is connected to the pump line 47. The pressure space 69 is also connected via the valve 70 and the pressure space 77 via the valve 78 to the pump line 47. System pressure prevails in the pressure spaces. The pressure spaces 33 and 57 are relieved to the tank via the valve 85. If, then, the lifting spindle is moved in the direction of the fixed mold clamping plate 10, the hydraulic piston 20 is taken up via the hydraulic piston 16 and via the pressurized, that is to say compressed pressure-medium cushion located in the pressure space 31, without the pressure medium in this case being compressed any further. There is a virtually rigid connection between the lifting spindle 14 and the hydraulic piston 20. The intermediate part 22 is taken up, likewise in a virtually rigid manner, by the hydraulic piston 20 via the pressure-medium cushion in the pressure space 77, the two hydraulic pistons 75 and 65, the piston rod 68, the hydraulic piston 67 and the pressure-medium cushion in one pressure space of the latter.

After the closing of the mold, the intermediate part 22 is locked with respect to the machine stand. The two valves 70 and 78 change over, so that the two pressure spaces 69 and 77 are relieved to the tank. The valve 50 is brought into the working position in which the two pressure spaces 24 and 31 are connected to one another. The pressure space 38 remains connected to the pump line 47 via the valve 51, so that the hydraulic piston 35 is held reliably against the stop 41. If, then, the hydraulic piston 16 is moved further on in the direction of the mold clamping plate 10, a high keeping-shut pressure lying above the system pressure can build up in the pressure spaces 24 and 31 connected to one another and generates a very high keeping-shut force at the large active surface 25 of the hydraulic piston 20. In the event of a slight movement of the hydraulic piston 20 which still takes place in this case, the hydraulic piston 75 upstream of the hydraulic piston 65 can readily be taken up, since the pressure space 77 is relieved of pressure.

After the injection of the plastic into the mold, after a possible dwell-pressure phase and after a solidification time, the lifting spindle 14 is moved in the direction away from the fixed mold clamping plate 10 and the pressure medium in the pressure spaces 24 and 31 is thereby expanded. After expanding, the hydraulic piston 16 bears with the tappet 32 against the hydraulic piston 36. The valve 50 is brought into the working position in which the two pressure spaces 24 and 31 are relieved to the tank. The valve 51 changes over, so that the pressure space 38 is relieved to the tank. The valve 78 changes over, so that the pressure space 77 is acted upon by the system pressure. The valve 85 changes over in order to shut off the two pressure spaces 33 and 57 relative to the tank. As a result of the movement of the lifting spindle 14, then, the hydraulic piston 35 is moved by the latter, via the hydraulic piston 16 and the tappet 32, with the effect of a reduction in the pressure space 33, so that pressure medium is displaced out of this pressure space into the pressure space 57. A pressure builds up there, which generates at the hydraulic piston 75 a force which reduces the bearing force of said hydraulic piston against the step 80 of the hydraulic piston 20. The reaction force is absorbed via the hydraulic pistons 65 and 67 by the intermediate part 22 and consequently by the machine stand. Finally, the bearing force of the hydraulic piston 75 is reduced to an extent such that the excess force generated by the system pressure prevailing in the pressure space 77 is sufficient to separate the mold halves from one another. The progress of this tearing open of the mold may in this case be controlled via the traveling speed of the lifting spindle 14. The pressure space 69 is in this case reduced due to the relative movement between the hydraulic piston 20 and the hydraulic piston 65.

After the tearing-open operation, the locking of the intermediate plate 22 is released. The valve 85 switches and connects the two pressure spaces 33 and 57 to the tank. Moreover, the two valves 51 and 70 change over, so that pressure medium can flow, throttled, to the pressure spaces 38 and 69 from the pump line 47, as indicated in the respective circuit diagram by the nozzle. The hydraulic piston 20 and the intermediate part 22 move relative to one another and to the lifting spindle in such a way that they assume the positions, shown in FIG. 3, in relation to one another and to the lifting spindle.

The valve 50 is then brought into the working position in which it connects the pressure space 31 to the pump line 47. The pressure space 31 is acted upon by system pressure, so that the hydraulic piston 20 and the intermediate part 22 continue to follow exactly the movement of the lifting spindle 14 in the opening direction into the opening position.

The exemplary embodiment according to FIG. 2 lacks, as compared with the exemplary embodiment according to FIG. 3, the stop, to be made active and inactive, for the hydraulic piston 65. During the closing of the mold, the valves 50, 51 and 70 assume the same positions as in the exemplary embodiment according to FIG. 3 in the same movement phase. The hydraulic piston 65 bears against the hydraulic piston 20 on the piston-rod side, and the hydraulic piston 67 is blocked with respect to the intermediate part 22.

When the mold is closed, the intermediate part 22 is positioned at the hydraulic piston 67, by the supply of pressure medium into one pressure space and by the discharge of pressure medium out of the other pressure space, in such a way that said intermediate part can be interlocked with the locking rods 59. During positioning, the pressure space 24 is still connected to the tank via the valve 50, so that a change in volume can be compensated. After the locking of the intermediate part 22, the hydraulic piston 67 is switched so as to be freely movable by means of the connection of the two pressure spaces adjacent to it to the tank. The valve 50 is brought into the position in which the pressure spaces 24 and 31 are connected to one another. As a result of a further movement of the lifting spindle 14 and consequently of the hydraulic piston 16 in the closing direction, a high pressure builds up in the pressure spaces 31 and 24 and generates a high keeping-shut force at the large active surface 25. In the event of a slight movement of the hydraulic piston 20 which still takes place in this case, the hydraulic piston 65 can readily be taken up, since the hydraulic piston 67 is switched free.

After the injection of the plastic into the mold, after a possible dwell-pressure phase and after a solidification time, the lifting spindle 14 is moved in the direction away from the fixed mold clamping plate 10 and the pressure medium in the pressure spaces 24 and 31 is thereby expanded. After expansion, the hydraulic piston 16 bears with the tappet 32 against the hydraulic piston 35. The valve 50 is brought into the working position in which the two pressure spaces 24 and 31 are relieved to the tank. The valve 51 changes over, so that the pressure space 38 is relieved to the tank. The hydraulic piston 67 is blocked hydraulically with respect to the still locked intermediate part 22. As a result of the movement of the lifting spindle 14, then, as in the exemplary embodiment according to FIG. 3, the hydraulic piston 35 is moved by the latter, via the hydraulic piston 16 and the tappet 32, with the effect of a reduction of the pressure space 33, so that pressure medium is displaced out of this pressure space into the pressure space 57. A pressure builds up there, which acts directly upon the hydraulic piston 20 at a surface corresponding to the annular surface of the hydraulic piston 65 and which generates a tearing-open force. The reaction force is absorbed via the hydraulic pistons 65 and 67 by the intermediate part 22 and consequently by the machine stand.

After the tearing-open operation, the locking of the intermediate plate 22 is released. The two valves 51 and 70 change over, so that pressure medium can flow, throttled, to the pressure spaces 38 and 69 from the pump line 47. The hydraulic piston 20 and the intermediate part 22 move relative to one another and to the lifting spindle in such a way that they assume the positions, shown in FIG. 2, in relation to one another and to the lifting spindle.

The valve 50 is then brought into the working position in which it connects the pressure space 31 to the pump line 47. The pressure space 31 is acted upon by system pressure, so that the hydraulic piston 20 and the intermediate part 22 continue to follow exactly the movement of the lifting spindle 14 in the opening direction into the opening position.

In the exemplary embodiment according to FIG. 1, during the closing of the mold, the valves 50 and 51 assume the same positions as in the exemplary embodiment according to FIG. 3 in the same movement phase. The pressure spaces 31 and 38 are therefore connected to the pump line 47 and are acted upon by system pressure.

When the mold is closed, the intermediate part 22 is blocked in relation to the machine stand. The valve 50 is thereafter brought into the position in which the pressure spaces 24 and 31 are connected to one another. As a result of the further movement of the lifting spindle 14 and consequently of the hydraulic piston 16 in the closing direction, a high pressure builds up in the pressure spaces 31 and 24 and generates a high keeping-shut force at the large active surface 25.

After the injection of the plastic into the mold, after a possible dwell-pressure phase and after a solidification time, the lifting spindle 14 is moved in the direction away from the fixed mold clamping plate 10 and the pressure medium in the pressure spaces 24 and 31 is thereby expanded. After expansion, the hydraulic piston 16 bears with the tappet 32 against the hydraulic piston 35. The valve 50 is brought into the working position in which the two pressure spaces 24 and 31 are relieved to the tank. The valve 51 changes over, so that the pressure space 38 is relieved to the tank. As a result of the movement of the lifting spindle 14, then, as in the exemplary embodiments according to FIGS. 2 and 3, the hydraulic piston 35 is moved by the latter, via the hydraulic piston 16 and the tappet 32, with the effect of a reduction of the pressure space 33, so that pressure medium is displaced out of this pressure space into the pressure space 57. A pressure builds up there, which acts directly upon the hydraulic piston 20 at a surface corresponding to the active surface of the hydraulic piston 55 supported on the stationary mold clamping plate 10 and which generates a tearing-open force.

After the tearing-open operation, the blocking of the intermediate plate 22 is released. The valves 50 and 51 change over, so that pressure medium can flow, throttled, to the pressure spaces 31 and 38 from the pump line 47. The hydraulic piston 20 and the intermediate part 22 move in relation to the lifting spindle in such a way that they assume the positions in relation to the lifting spindle which are shown in FIG. 1. The hydraulic piston 20 and the intermediate part then exactly follow the movement of the lifting spindle 14 in the opening direction into the opening position.

The invention claimed is:

1. A drive device, in particular for driving a movable part of a closing unit or of an injection unit of a plastic injection molding machine during an adjusting movement and for subsequent build-up and exertion of a high force, comprising a drive element (14) movable axially by means of a drive motor (12), in particular by means of an electric motor, a hydraulic unit (17) movable as a result of movement of the drive element (14) in same direction as the latter, wherein the hydraulic unit (17) is a force intensifier with a first and a second of two hydraulic pistons (16, 20) movable in relation to one another and differing from one another in the size of their active surfaces (30, 25) and with an intermediate part (22), wherein the first hydraulic piston (16) having the smaller active surface (30) is connected mechanically to the drive element (14), wherein for the adjusting movement, the hydraulic unit (17) is movable as a whole, wherein for exerting a high force by means of the second hydraulic piston (20) having the larger active surface (25), the intermediate part (22) can be blocked against displacement in relation to a fixed stand (10), and wherein the first hydraulic piston (16) being adjacent with its active surface (30) to a first pressure space (31) in or on a housing formed by the second hydraulic piston (20) or by the intermediate part (22), said pressure space being fluidically connectable to a second pressure space (24), which is adjacent to the second hydraulic piston (20), in one position of a valve (50), via the latter, and to a pressure source (45) in another position of the valve (50), wherein a third hydraulic piston (35) designed as a stepped piston is present with a first active surface (40) at a first piston portion (36) and with a second active surface at a second piston portion (37), wherein the third hydraulic piston (35), by action of pressure upon a third pressure space (38) adjacent to its first active surface (40), is pressable in direction of adjusting movement of the first hydraulic piston (16) against a stop (41) fixed in relation to the housing (20), with a force which is higher than the force exerted on the housing (20) in same direction by the pressure in the first pressure space (31), wherein when the third pressure space (38) is relieved of pressure, the third hydraulic piston (35) is movable away from the stop (41) in direction opposite to the adjusting movement of the first hydraulic piston (16), and wherein the second piston portion (37) of the third hydraulic piston (35) forms, with a fourth hydraulic piston (55, 65) having an active surface larger than the second active surface of the third hydraulic piston (35), a hydraulic force intensifier for acting upon the second hydraulic piston (20) opposite to the adjusting movement.

2. The drive device as claimed in claim 1, wherein the third hydraulic piston (35) is arranged in alignment with the first hydraulic piston (16).

3. The drive device as claimed in claim 1, wherein the first active surface (40) of the third hydraulic piston (35) is larger than the active surface (30) of the first hydraulic piston (16), and wherein the third pressure space (38) and the first pressure space (31) are actable upon by same pressure.

4. The drive device as claimed in claim 3, wherein the first pressure space (31) and the third pressure space (38) are connectable to the same pressure source (45) in order to be acted upon by the same pressure.

5. The drive device as claimed in claim 4, wherein the third pressure space (38) via a switchable valve (51) is connectable to the pressure source (45) and relievable of pressure.

6. The drive device as claimed in claim 1, wherein the fourth hydraulic piston (55) is adjacent, with a boundary wall fixed in relation to the machine stand (10), to a pressure space (57).

7. The drive device as claimed in claim 1, wherein the fourth hydraulic piston (65) is fixable or is fixed with respect to the intermediate part (22) or to the second hydraulic piston and, in each case with the other part (20) of the two parts, intermediate part and hydraulic piston, delimits a pressure space (57) which is connected to a pressure space (33) at the second piston portion (37) of the third hydraulic piston (35).

8. The drive device as claimed in claim 7, wherein the fourth hydraulic piston (65) is located in or at the intermediate part or the second hydraulic piston (20) and is connected to a fifth hydraulic piston (67) in each case in the other part (22) via a piston rod (68).

9. The drive device as claimed in claim 8, wherein a sixth hydraulic piston (75), by the action of pressure upon a pressure space (77) adjacent to an active surface of the latter, is pressable against a stop (80) which is fixed in relation to part (20) in which the fourth hydraulic piston (65) is located, wherein the fourth hydraulic piston (65) is pressable, with a lower force than that with which the sixth hydraulic piston (75) is pressable against the stop (80), against the sixth hydraulic piston (75) with the effect of lifting off the sixth hydraulic piston (75) from the stop (80), and wherein, when the sixth hydraulic piston (75) is relieved of pressure, the latter is liftable off from the stop (80) by the fourth hydraulic piston (65).

10. The drive device as claimed in claim 9, wherein the sixth hydraulic piston (75) is actable upon, in the direction of the stop (80), and the fourth hydraulic piston (65) is actable upon, with the effect of lifting off the sixth hydraulic piston (75) from the stop (80), by the same pressure at active surfaces (79, 71) of unequal size.

11. The drive device as claimed in claim 9, wherein the sixth hydraulic piston (75) is arranged in alignment with the fourth hydraulic piston (65) and has a central perforation for a piston rod (68) connected to the fourth hydraulic piston (65).

12. The drive device as claimed in claim 10, wherein the sixth hydraulic piston (75) is arranged in alignment with the fourth hydraulic piston (65) and has a central perforation for a piston rod (68) connected to the fourth hydraulic piston (65).

13. The drive device as claimed in claim 1, wherein the fourth hydraulic piston (65) is arranged in or on the same housing (20) as the first hydraulic piston (16) and the third hydraulic piston (35).

14. The drive device as claimed in claim 9, wherein the fourth hydraulic piston (65) and the sixth hydraulic piston (75) are arranged in or on the same housing (20) as the first hydraulic piston (16) and the third hydraulic piston (35).

* * * * *